United States Patent [19]

Inventor

[11] Patent Number: 5,476,072
[45] Date of Patent: Dec. 19, 1995

[54] FUEL TOLERANT COMBUSTION ENGINE WITH REDUCED KNOCK SENSITIVITY

[76] Inventor: Evan G. Inventor, P.O. Box 156, Helotes, Tex. 78023

[21] Appl. No.: 338,324

[22] Filed: Nov. 14, 1994

[51] Int. Cl.$^6$ ............................................. F02B 75/04
[52] U.S. Cl. ........................... 123/48 AA; 123/78 AA
[58] Field of Search ................. 123/48 A, 48 AA, 123/78 A, 78 AA, 311, 1 A, 78 R, 48 R78 B, 78 D, 193.1, 193.5, 193.3; 92/84

[56] References Cited

U.S. PATENT DOCUMENTS

| | | | |
|---|---|---|---|
| 1,318,371 | 10/1919 | Fredericksen | 123/78 A |
| 1,504,101 | 8/1924 | Davidson | 123/48 A |
| 2,260,982 | 10/1941 | Walker | 123/78 AA |
| 2,399,276 | 4/1946 | Kratzer | 123/78 AA |
| 2,414,217 | 1/1947 | Weiss et al. | 123/78 AA |
| 3,682,147 | 8/1972 | Irgens | 123/48 R |
| 3,964,452 | 6/1976 | Nakamura et al. | 123/78 AA |
| 4,187,808 | 2/1980 | Audoux | 123/48 AA |
| 4,516,537 | 5/1985 | Nakahara et al. | 123/78 AA |
| 4,987,863 | 1/1991 | Daly | 123/48 AA |
| 5,007,384 | 4/1991 | Blair | 123/48 A |

Primary Examiner—Marguerite Macy
Attorney, Agent, or Firm—Gunn, Lee & Miller

[57] ABSTRACT

A supplemental cylinder head assembly for operation of an engine in a homogeneous charge compression ignition combustion mode. The supplemental cylinder head assembly provides a movable accumulator piston position above the main combustion chamber. The accumulator piston is upwardly responsive to the combustion event in the main combustion chamber and downwardly to a preload force. An engine adapted to receive the supplemental cylinder head assembly is capable of efficiently operating on any fuel in the octane range of zero to 130.

13 Claims, 7 Drawing Sheets

FUEL TOLERANT COMBUSTION ENGINE WITH REDUCED KNOCK SENSITIVITY

BACKGROUND OF THE INVENTION

The present invention relates to combustion engines and, more particularly, to an engine incorporating a low mass, high-rate shock-absorbing cylinder head component which suppresses combustion knock caused by very high reaction rates.

There are strong demands for engines that exhibit the following characteristics and even combinations of the following characteristics: high power density using heavy distillate hydrocarbon fuels (diesel, JP-5, JP-8, etc.); multi-fuel capability; substantially reduced emissions of exhaust pollutants; reduced knock sensitivity; and high power density closed-cycle operation. The present invention relates to a newly-developed engine that is extremely fuel tolerant and capable of efficiently using any fuels ranging from 0 to 130 in octane value.

The new technology exhibited by the engine of the present invention effectively utilizes homogeneous charge compression ignition (HCCI) combustion, and is also well suited to spark ignited combustion and late-cycle injection diffusion combustion characteristic of diesel engines. HCCI combustion has long been considered a combustion phenomenon of great theoretical benefit, but very little practical substance. This unique type of hybrid combustion can, in theory, combine the best elements of diesel combustion with the best elements of spark-ignited combustion. The substantial problem affecting the useful utilization of HCCI combustion is the very high rate of energy release (severe detonation) resulting from the compression-ignition of a homogeneous charge.

Detonation produces very high instantaneous cylinder pressure and temperature that rapidly damages or destroys engine components. Spark ignited engines have controlled energy release rates (burn rates) which are governed by the rate of flame travel across the combustion chamber. Diesel cycle combustion rate is controlled by both mixing rate and fuel injection rate.

An important feature of the engine of the present invention is its ability to accommodate very high reaction rate combustion without subjecting the engine structure to the destructive stresses caused by excessively high cylinder pressures and temperatures which are typical of very high reaction rates. The homogeneous air/fuel mixture present for HCCI combustion is highly reactive when compression ignited and lacks control elements to limit the reaction rate. The present inventive engine incorporates a low-mass, high-rate, shock absorbing cylinder head component which suppresses combustion knock caused by very high reaction rates. This present inventive system effectively limits peak cylinder pressure and temperature, hence limiting structural and thermal loads imparted to the engine.

Traditionally, there have been two primary forms of reciprocating piston internal combustion engines: compression ignition (CI) and spark ignition (SI) engines. While these engine types have similar architecture and mechanical workings, each has distinct operating properties which are vastly different from each other.

Spark ignited engines, commonly called gasoline engines, use a spark plug to initiate the combustion event. Compression ignited engines, also called diesel engines, utilize the heat generated by the rapid compression of air, and the timed injection of fuel into the combustion chamber to initiate combustion.

Gasoline and diesel fuels have vastly different distillation and combustion characteristics, even though they have quite similar energy densities (btu per pound of fuel) and latent heat of vaporization values. Despite some similarities, the combustion of diesel fuel in a compression ignition engine is much different than the combustion of gasoline in a spark ignition engine.

There is substantial demand for engines with high power density (HP/pound of engine weight) that use heavy distillate fuel (diesel fuel, for example). Lightweight two-stroke cycle gasoline engines exhibit superb power density, but do not use heavy distillate fuel. A diesel engine which uses such heavy distillate fuel, has a low power density for two principal reasons:

(1) Weight. The diesel engine requires robust engine structures and components to accommodate the high loads imparted by diesel combustion.
(2) Power Output. The diesel engine is speed-limited to 3000–5000 RPM. Horsepower is a function of both speed and torque. Additionally, diesel combustion at the maximum permissible exhaust smoke limit can typically only use 75% of the available oxygen in the air.

On the other hand, modern two-stroke gasoline engines exhibit very high power density, but are typically highly intolerant of heavy fuels. Attempting to operate a spark ignited gasoline engine on heavy fuel is very difficult. If the fuel is sufficiently heated (600° F.) and properly dispensed into the intake air stream, the engine will run, provided the engine is run at an air/fuel ratio (A/F ratio) richer than or near a stoichiometric ideal. At such A/F ratio, the heavy distillate fuel is running in a spark ignited mode which is very different than the compression ignition of diesel cycle combustion. Within a few seconds of running, spark ignited, heavy fueled combustion becomes unstable and knocks or detonates. Engine failure may occur as quickly as 5–10 seconds after detonation occurs.

Past HCCI combustion research efforts have been guided and limited predominately by the narrow margins of acceptable operating regimes, i.e., operating regimes that allow the engine to run without knocking. This inability to control knock has severely limited the practical effectiveness of HCCI combustion. Therefore, realization of effective and practical HCCI combustion is possible if an engine is designed that is either detonation tolerant or detonation non-susceptible. The present invention provides such a practical HCCI design.

The engine of the present invention is appropriately designed to be tolerant of knock or non-susceptible to knock thereby achieving excellent operation by running in the HCCI combustion mode.

SUMMARY OF THE INVENTION

An engine having a power piston reciprocatable within a combustion chamber or cylinder and which is equipped with a standard power transfer train is provided with a supplemental cylinder head assembly having an accumulator piston housing with an internal displacement volume. A movable, reciprocating combustion accumulator piston is adapted to slide within the housing during the various phases of the engine's combustion cycle. The accumulator is upwardly responsive to the combustion event of the main engine cylinder and downwardly to preload force which urges the combustion accumulator piston to a rest position. The combustion accumulator piston is provided with an annular piston ring to divide the internal volume of the combustion accumulator housing into a first upper volume and a second lower volume. The inner wall of the combustion accumulator piston housing is provided with a multiplicity of depressions all lying along the same horizontal plane which cooperate with the annular piston ring during movement of the combustion accumulator piston, to facilitate the passage of compressed gas between the first upper volume and the second lower volume to control the rebound characteristics of the combustion accumulator piston. A guide mechanism within the combustion accumulator piston housing provides not only guidance of the combustion accumulator piston during movement but also functions to cool the combustion accumulator piston and seal the housing. A variable pressure control system preloads the combustion accumulator piston within the supplemental cylinder head to retain the combustion accumulator piston at a first resting position. All of the components of the present invention cooperate to allow the engine to operate efficiently on any fuel having an octane value between zero and 130. The engine operates in a homogeneous charge compression ignition (HCCI) combustion mode.

DETAILED DESCRIPTION OF THE PREFERRED EMBODIMENT

The present invention uses a movable combustion chamber surface to change the volume of the combustion chamber during the combustion event. The compression ratio is variable and established by the resting position of the moving surface.

Figure 1:
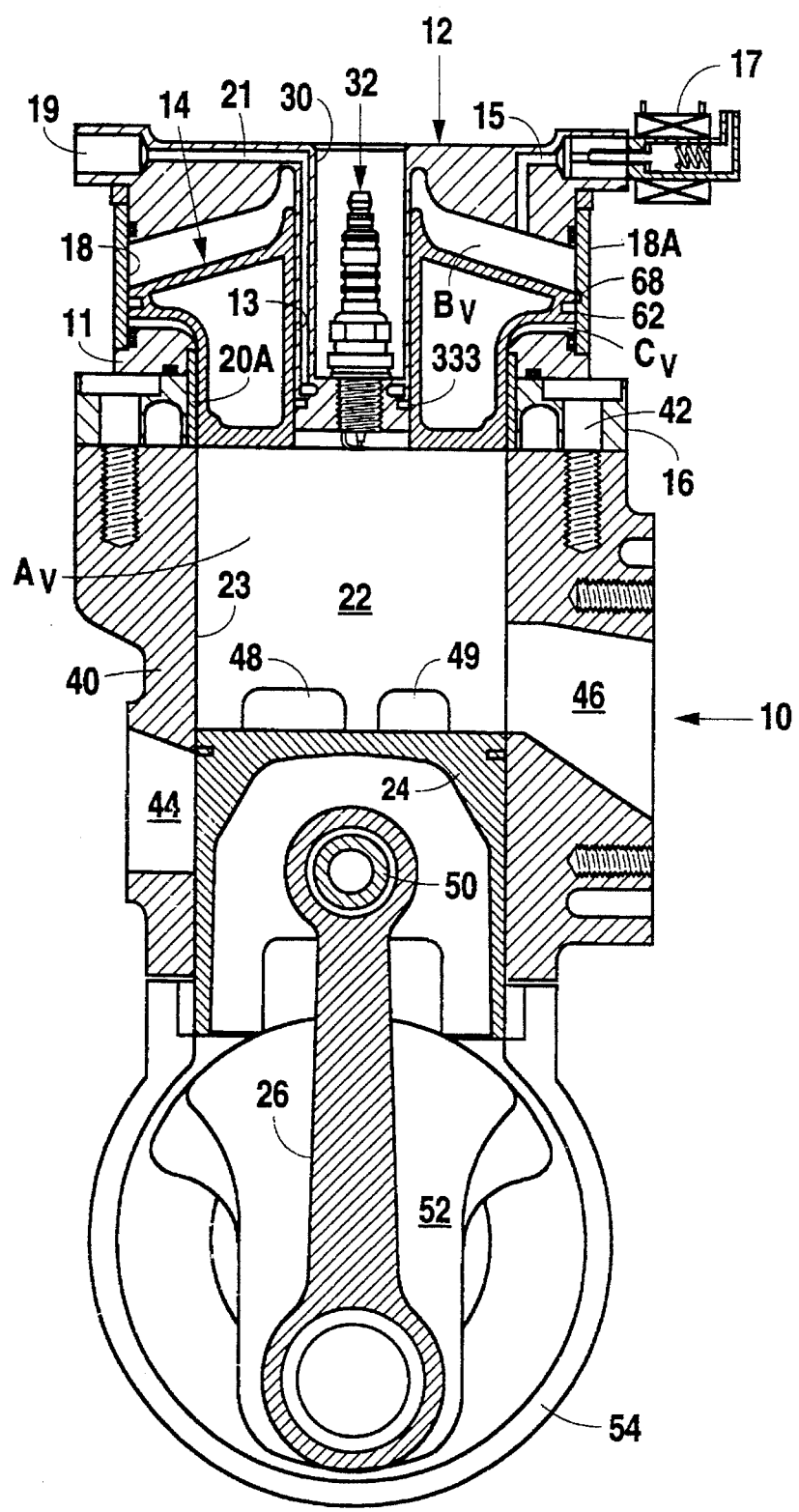
FIG. 1 illustrates a cross-sectional view of an engine of the present invention in the bottom-dead-center phase.

FIG. 1 shows a sectional view of the present inventive system in a two-stroke engine. However, it should be understood that the present invention could operate with a sleeve valve or side valve four-stroke engine. The primary components of the engine 10 that make the engine detonation tolerant (or detonation non-susceptible) thereby permitting HCCI combustion and wide fuel tolerance are the components comprising the cylinder head assembly 12. Cylinder head assembly 12 includes the combustion accumulator piston (CA piston) 14; combustion accumulator major bore wall (CA major bore wall) 18A; combustion accumulator guide (CA guide) 30; combustion accumulator minor bore wall (CA minor bore wall) 20A; and base member 11. An engine of the present invention is capable of efficiently operating on any of a wide range of fuels, such as zero octane, light distillate hexane to 130 octane, natural gas (predominately methane).

The combustion accumulator piston (CA piston) 14 acts as a movable combustion chamber surface that limits peak cylinder pressure and temperature. It is arranged within the cylinder head assembly 12 and is preloaded downward with substantial air pressure that is admitted through conduit 15 and varied or modulated into the space or volume $B_v$ above CA piston 14 by any known means for controlling and varying pressures such as a pulse width modulated solenoid valve 17.

The CA piston 14 reciprocates within two bores, the CA major bore 18 formed along the inside of wall 18A and the CA minor bore 20 formed along the inside of wall 20A. The reciprocating action of CA piston 14 is effected by pressure fluctuations in the main combustion chamber 22 caused by the combustion event and by movement of the power piston 24. Movement of the CA piston 14 occurs only slightly during the compression event, and most drastically during the combustion and expansion event as discussed below. CA piston 14 is, therefore, responsive to engine conditions on a per-cycle basis. Thus CA piston 14 is active and moving during each engine cycle.

The reciprocation frequency of the CA piston 14 in cylinder head assembly 12 is the same as that of the power piston 24 in the main combustion chamber 22. This dependent relationship is quite different than that of an engine control device which changes (moves) but is not synchronized to engine cyclic motion, e.g., the throttle mechanism.

Figure 3A:
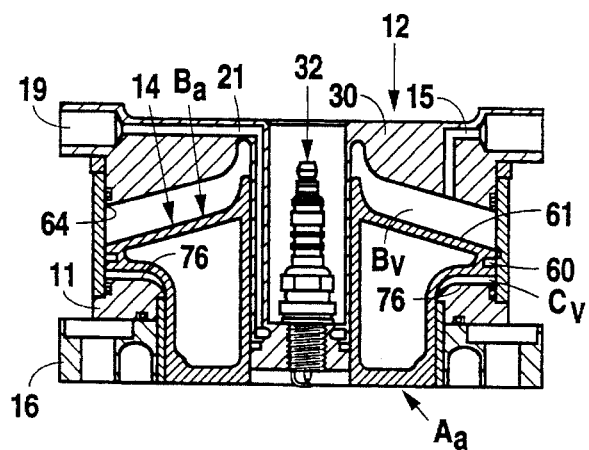
FIG. 3A illustrates the supplemental cylinder head assembly in cross section in the preloaded (rest) position.
Figure 3D:
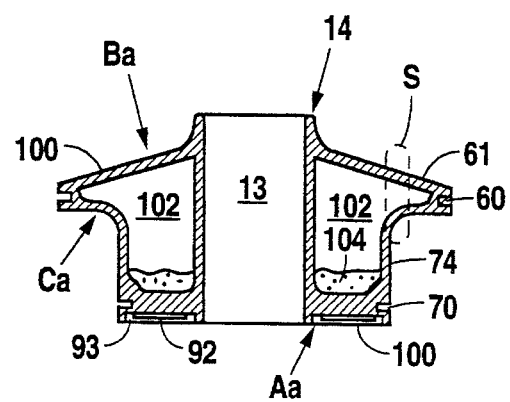
FIG. 3D illustrates a cross-sectional view of the combustion accumulator piston of the present invention with an internal coolant and an air gap boundary at the combustion surface.

Turning momentarily to FIG. 3D, it may be seen that the CA piston 14 is a hollow machined aluminum component with internal webbing that has a cone-shaped top piece 100 that is welded in place prior to final machining. It has an internal bore 13 through its vertical axis that fits closely to and is guided by the CA guide 30. In addition to sealing the top of space or volume $B_v$, the CA guide 30 serves to guide the CA piston 14 during reciprocation and is well suited to this task because it has a favorable length, relative to its diameter (L/D ratio).

CA guide 30 also mounts a spark plug 32 very near the center of the combustion chamber 22 (favorable to good combustion when running in the spark ignited mode), and has internal coolant passages 21 to aid in transferring heat from the CA piston 14. The preload/accumulator pressure that is modulated into volume $B_v$ by the pulse width modulated solenoid valve 17 comes from the combustion chamber 22 via a check valve (not shown). The system is self-sufficient, requiring no additional air compressor. Base 11 retains walls 18A and 20A in alignment, includes mechanical travel limit 76, and provides the mating surface and seal for attachment to the main cylinder head 16 of the engine 10.

Figure 3B:
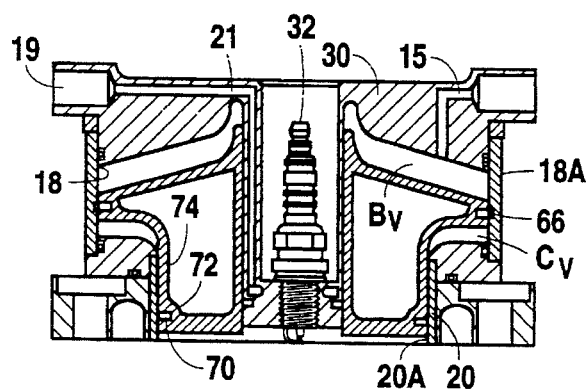
FIG. 3B illustrates the supplemental cylinder head assembly in the equilibrium position.
Figure 3E:
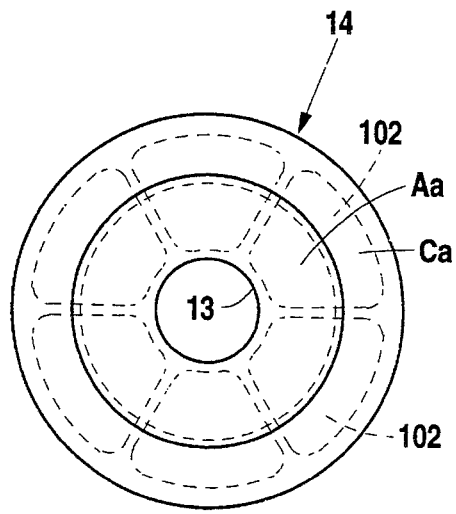
FIG. 3E illustrates a bottom view of the combustion accumulator piston of the present invention.
Figure 3C:
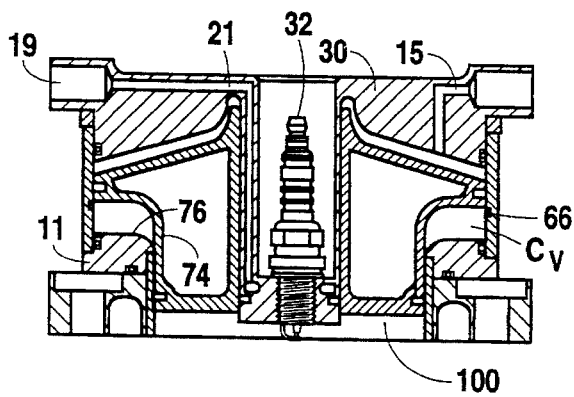
FIG. 3C illustrates the supplemental cylinder head assembly in the peak pressure position.
Figure 3F:
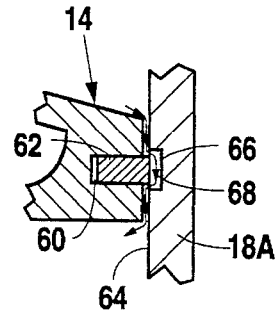
FIG. 3F illustrates a detailed view of the combustion accumulator piston ring in relation to the wall divots for fluid communication between the two housing volumes of the present invention.

As may be seen in FIGS. 3D and 3F, CA piston 14 has a major annular ring groove 60 in the upper cap or top portion 61 of piston 14. Groove 60 accepts and retains major CA piston ring 62 (see FIG. 3F). The inside wall 64 of the cylinder head assembly 12 is provided with numerous spaced-apart dimples or divots 66, all lying in the same horizontal plane along inside wall 64, which cooperate with the piston ring 62 of CA piston 14 to result in the formation of balance ports 68. These ports 68 allow for the equalization of pressure above CA piston 14 in volume $B_v$ and below CA piston 14 in volume $C_v$ during the operation of the engine 10. This will be discussed further below. CA piston 14 also has a minor piston ring 70 set in annular groove 72 on the lower neck portion 74 of the piston 14 as shown in FIG. 3B.

FIGS. 3D and 3F further illustrate that combustion accumulator piston 14 is provided with a number of hollow inner chambers 102. Chambers 102 may be injected with a small amount of liquid coolant 104 to enhance the cooling operation of the combustion accumulator piston. Further, combustion accumulator piston 14 may be provided with an insert to form an insulative air gap boundary at the base of the piston 14. A stainless steel end plate 93 is securely affixed to the bottom of combustion accumulator piston 14 with an air gap 92 formed between plate 93 and the main body portion of the combustion accumulator piston 14. Thus, during operation the engine, plate 93 may operate at high temperature, but less heat is transferred to the combustion accumulator piston 14 and the combustion accumulator piston is further cooled by the internal coolant 104 in chambers 102.

Also shown in FIGS. 1 and 3A–3C, a coolant inlet 19 and coolant passage 21 are provided in CA guide 30. It should be understood that an exit (not shown) is provided in CA guide 30 to allow coolant to circulate through the inlet 19 and through passage 21 out the guide 30.

FIG. 1 illustrates that cylinder head assembly 12 is mounted on engine block 40 by conventional fasteners 42 which pass through a mounting flange of the main cylinder head 16. Power piston 24 reciprocates within combustion cylinder 22. Block 40 is provided with an intake port 44, an exhaust port 46, and transfer ports 48 and 49. As is well known in the art power piston 24 is attached to connecting rod 26 by wrist pin 50. Connecting rod 26 is further attached to the crankshaft 52 within the crankcase 54. Thus, the engine block assembly is generally typical of those used with conventional engines, and few if any modifications need to be made to retrofit a conventional engine block to accept a CA type cylinder head assembly 12.

Figure 2:
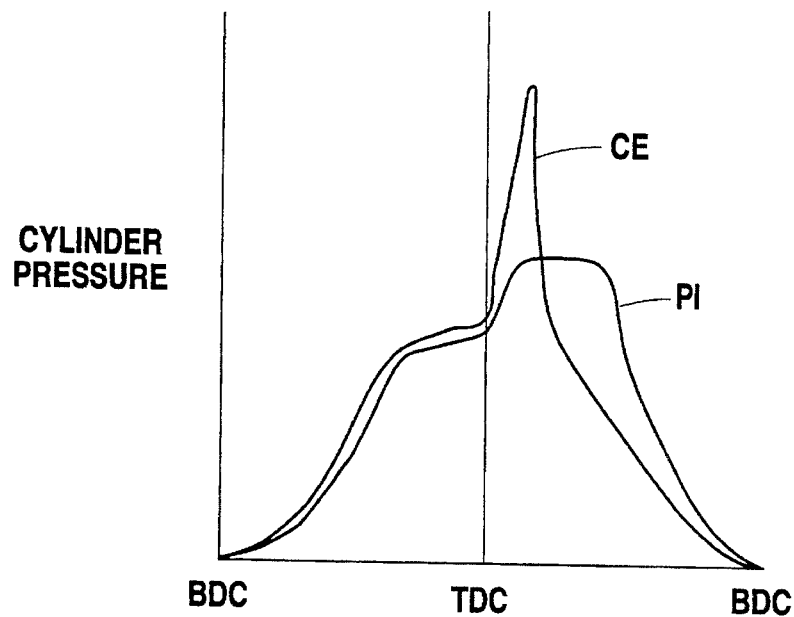
FIG. 2 graphically illustrates approximate cylinder pressure for different crankshaft positions.

The present inventive engine 10 is effective because it allows a rapid increase in combustion chamber volume $A_v$ to prevent excessive cylinder pressure from over-stressing engine components. FIG. 2 shows an approximate, graphic representation of cylinder pressure versus crankshaft position for both a conventional engine trace CE and the trace PI of the present inventive engine. The area beneath each curve represents the gross energy available to produce work. Ideally, the area under each curve is the same—only the shape is different.

The present inventive engine 10 equipped with cylinder head assembly 12 provides considerably lower peak cylinder pressure (for reduced engine stress) but maintains the reduced combustion pressure much longer into the expansion cycle than a non-equipped conventional engine. In FIG. 2, the graph of the pressure trace (CE) of the conventional engine shows a very high pressure magnitude applied just after top-dead center (TDC), when piston velocity (and the change in combustion chamber volume) is very low. The pressure trace (CE) indicates the occurrence of detonation that rapidly destroys the engine due to the very high mechanical and thermal loads imparted. In the present invention, CA piston 14 serves as an accumulator, analogous to a gas spring. Energy is absorbed, stored, then returned to the engine system as will be discussed below. With the exception of frictional, leakage, and heat losses, the CA piston 14 returns the absorbed energy to the expansion cycle. This yields vastly greater efficiency than a system that purges excess cylinder pressure without returning the energy, e.g., a pressure relief valve.

The present inventive system is necessitated by the fact that rapid combustion occurs at (or very near) TDC, when the power piston's 24 velocity decreases to zero and the connecting rod 26 has no angular displacement. At this position, combustion chamber 22 volume $A_v$ is at a minimum, which yields maximum pressure generated for a given mass of reactants (assuming instantaneous combustion rate). It is at this instant that the advantages of the present inventive system may be realized.

CA piston 14 has low mass and a large surface area. This will result in significant acceleration since force=mass X acceleration.

CA piston 14 has a large surface area upon which combustion and balancing pressure may act. Thus for piston 14, the pressure-area term is large in the known equation force= pressure X area. Combining and manipulating the two equations above yields the new equation:

acceleration=pressure X area/mass.

By initially maximizing the surface area of the CA piston 14 to the practical limit and reducing its mass to its practical limit, a very responsive, high-acceleration system is derived. High rate acceleration of the CA piston 14 makes it responsive to the very rapid pressure increase that is typical of very high reaction rate combustion. This enhanced response lessens the shock loading of the other engine components. The responsive nature of the CA piston 14 also reduces the momentum and inertial effects during deceleration. This is important at the top of its stroke because a rapid return (during the expansion cycle) of absorbed energy to the expansion event has a profound effect on engine efficiency. Reduced momentum and inertial effects are most important when the CA piston 14 returns to the resting (preloaded) position at the bottom of its stroke.

The cylinder head assembly 12 is shown attached to the engine in FIG. 1 and isolated and enlarged in FIGS. 3A–3C. Preload of the CA piston 14 is essential to the operation of the present inventive engine 10. FIG. 3A illustrates CA piston 14 in the resting (preloaded) position. Preload pressure acting on area $B_a$ at the top surface of CA piston 14 creates a force that holds the CA piston 14 down, very near its mechanical travel limit 76. The CA piston 14 remains substantially static during the compression cycle and early into the combustion event. However, as shown in FIG. 3B, the CA piston 14 does move up very slightly during these events. This lack of significant movement is due to the preload force and determines the compression ratio of the combustion chamber 22. The desire is to rearrange only the peak cylinder pressure regime of the pressure trace (PI).

The CA piston 14 utilizes a stepped-bore configuration as may be seen in FIGS. 3D and 3E. This design enables proper component cooling and optimization of the three areas upon which gas pressure acts. As diagrammed in FIGS. 3D and 3E, areas $A_a$, $B_a$ and $C_a$ each influence the loading of the CA piston 14. Area $A_a$+Area $C_a$=Area $B_a$.

For the purposes of explanation and not by way of any limitation the following example is provided:

Cross sectional area (CSA)=(3.14)(bore dia.)×(bore dia.)/4.

If CA piston minor bore=2.764 in., then $CSA_{mn}$=6.0 sq.in.=Area $A_a$; and if CA piston major bore=3.909 in., then $CSA_{mj}$=12.0 sq. in.=Area $B_a$.

When the preload pressure in volume $B_v$=300 lb/sq.in. (at resting position (FIG. 3A)), then the preload force on CA piston 14=(300 lb/sq.in.)(12.0 sq.in.)=3600 lb.

If cylinder pressure (Volume $A_v$=zero (power piston at bottom dead center (BDC)), then rebound force must equal 3600 lb.

Pressure in volume $C_v$=3600 lb/6 sq. in.=600 lb/sq.in. (at resting position (FIG. 3A)).

Figure 4:
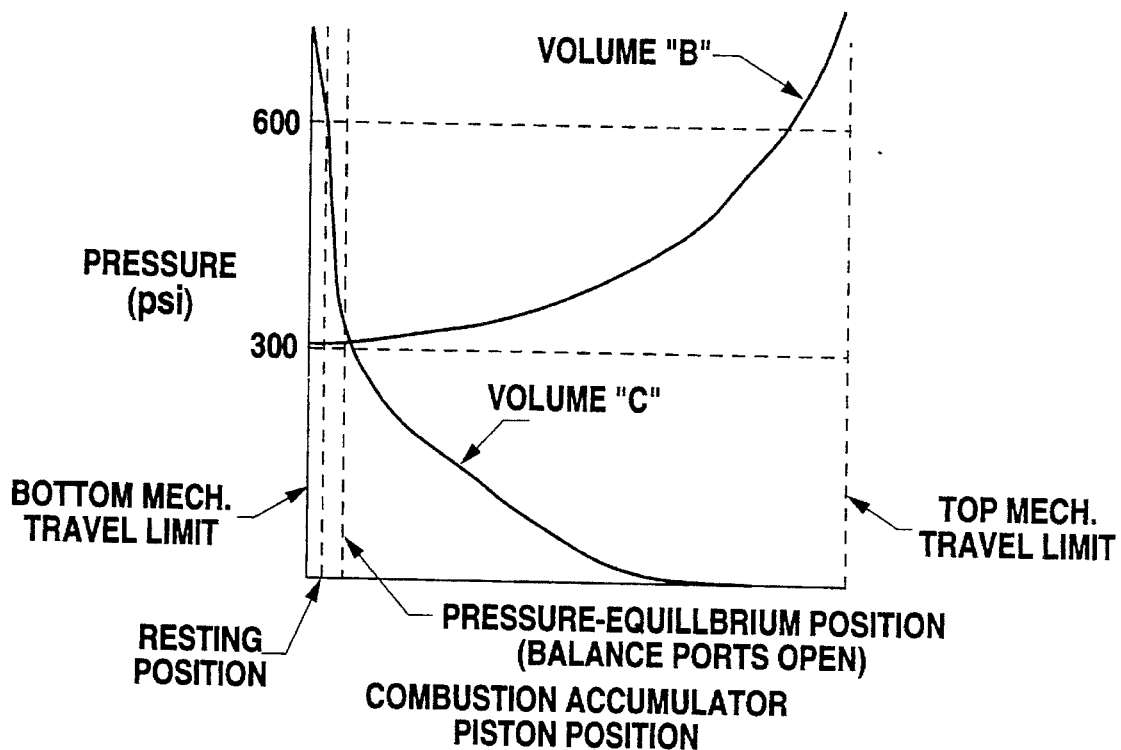
FIG. 4 graphically illustrates various combustion accumulator piston positions versus cylinder pressure.

Examining one cycle beginning at resting position (FIGS. 1 and 3A), the engine power piston 24 is at bottom dead center BDC, and the CA piston 14 is at its resting position shown in FIG. 3A. The CA piston 14 is in equilibrium and is not in contact with the bottom travel limit 76 on base 11, although it is quite near. The CA piston 14 is subjected to stress, however, because the balancing pressures that are present are applied to the CA piston in different locations and at different magnitudes. A pressure of 300 lb/sq.in. acts upon the area $B_a$, while a pressure of 600 lb/sq.in. is required in volume $C_v$ because area $C_a$ has only ½ the surface area of area $B_a$. This imposes substantial shearing and bending stress in the CA piston in the region S noted in FIG. 3D. It should be noted that air pressure of 300 lb/sq.in. is only modulated into the system at volume $B_v$ through valve 17. The pressure is admitted from volume $B_v$ to volume $C_v$ (at 300 psi) during an earlier portion of the cycle, via the balance ports 68, when the CA piston ring (major) 62 passes the radially spaced dimples or divots 66 in major bore 18 along the inside surface 64 of CA major bore wall 18A. This relationship of elements rapidly equalize the pressure conditions in volume $B_v$ and volume $C_v$. The air is compressed to an equilibrium pressure of 600 psi, for example, by the movement of the CA piston 14 to the resting position shown in FIG. 3A. At such a position the volume of $C_v$ is very small and the pressure in volume $C_v$ is high. The pressure of a gas in volume $C_v$ changes radically for a very small change in the CA piston position, as is shown in the graph of FIG. 4.

As the crankshaft 52 rotates and the power piston 24 moves upward along the main cylinder bore 23 and past the exhaust port 46, compression pressure is building in the combustion chamber 22. This increasing pressure applies an upward force on area $A_a$ to the CA piston 14. This increased pressure moves the CA piston 14 only slightly. There are two reasons that this pressure application has minimal effect on CA piston 14. The increasing compression pressure is being applied to area $A_a$ on the bottom on CA piston 14 which only has ½ the surface area of area $B_a$ on the top surface of CA piston 14 and area $B_a$ is preloaded to 300 psi, for example. Secondly, referring to the plot of volume $C_v$ pressure versus CA piston position in FIG. 4, it may be seen that the pressure contribution of volume $C_v$ (which acts in the same direction as the increasing combustion chamber pressure) diminishes sharply as CA piston 14 is moved from the resting position.

At the end of the engine's compression cycle, when the compression pressure is 175 psi, for example, CA piston 14 is positioned somewhere between the resting position shown in FIG. 3A and the pressure equilibrium position shown in FIG. 3B. The pressure equilibrium position shown in FIG. 3B occurs when the CA piston 14 is positioned where the balance ports are open to equalize the pressure in volume $B_v$ and volume $C_v$. At this instant, combustion chamber pressure in volume $A_v$ is also equal to the two other pressures (pressure in all three volumes is 300 psi, for example).

The pressure equilibrium position of the CA piston is only a reference position that is useful for process explanation. The CA piston 14 is in transition whenever it passes this pressure equilibrium location, either ascending or descending in its bore. The final compression pressure is lower than the pressure required to reach the pressure equilibrium position. Combustion pressure is required to propel the CA piston 14 past this point. The pressure equilibrium position does not invoke substantial pressure changes between volume $B_v$ and volume $C_v$ during the cycle. It is more of a control measure that ensures equilibrium at that location. This is important for accurately controlling the rebound and resting positions. The reason that the balance ports 68 exist is to define the location of the pressure equilibrium position and to make slight corrections on a cycle-to-cycle basis. Such minor corrections are necessitated by leakage past the CA piston rings 62, 70, and guide ring 333. Guide ring 333 serves as a seal as piston 14 moves upwardly and downwardly along guide 30.

Near the end of the engine's compression cycle, combustion is initiated by either spark ignition or compression ignition, depending on variables such as fuel octane value, engine temperature, and compression ratio. If a low octane fuel is being used, it becomes chemically unstable at this time and commences burning at a very rapid rate. The combustion chamber pressure very rapidly increases at combustion and propels the CA piston 14 upward in cylinder head assembly 12. FIG. 2 shows the smooth, controlled application of pressure PI resulting from uncontrolled, high-rate combustion. The CA piston 14 is driven upward to a position that satisfies all three of the pressure area forces acting upon it. This action increases the pressure in volume $B_v$ and rapidly decreases the pressure in volume $C_v$. This is also illustrated in FIG. 4.

Figure 5:
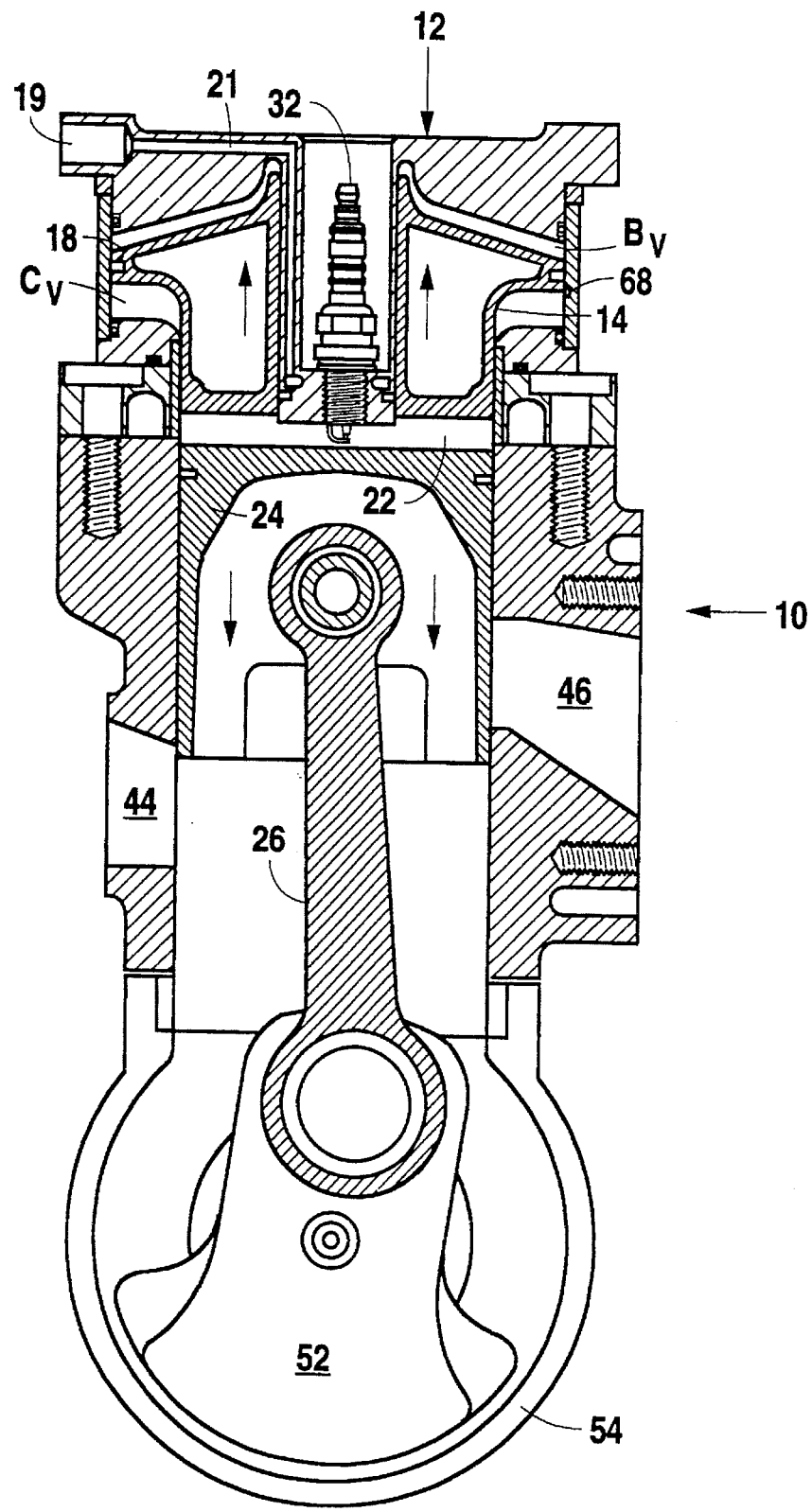
FIG. 5 illustrates a cross-sectional view of an engine of the present invention in a 10° after top-dead-center phase.

FIG. 5 illustrates the position of the CA piston 14, and the power piston 24 after rapid commencement of the combustion event; specifically 10° after TDC. The CA piston 14 has moved up rapidly to accommodate the high pressure rise in the combustion cylinder 22. The power piston 24 is shown moving downward at a relatively low velocity. The power piston 24 is not capable of the rapid movement noted with the CA piston 14, because the power piston 24 is coupled to the massive cranktrain components including the connecting rod 26 and crankshaft 52.

As stated, the CA piston 14 rapidly attains its highest position in head assembly 12 after combustion. Thereafter, the rate of descent of the CA piston 14 is governed by the rate of descent of the power piston 24 in its cylinder bore 23. The energy is returned to the engine system at the rate at which the engine will accept it.

During descent, near the bottom of its stroke, the CA piston 14 passes the pressure equilibrium position, where there is a brief period of time that the balance ports 68 are open passages to equalize the pressure of volume $B_v$ and volume $C_v$. If the pressure at this instant is, for example, 300 psi, then that is the pressure that is trapped in volume $C_v$ as the CA piston 14 moves further downward thus and closes off the balance ports 68. Because the area ratio between area $B_a$ and area $C_a$ is, for example, 2.0, the CA piston 14 will continue moving downward until it compresses the trapped volume $C_v$ to 600 psi, as the cylinder pressure continues to decrease. Volume $C_v$ is properly designed to minimize the trapped volume, and dramatic compression occurs very rapidly, in a short distance as is again illustrated in FIG. 4. This action serves to decelerate the CA piston 14 and accommodate the increasing preload force, without permitting the CA piston 14 to contact the mechanical travel limit 76. Preload force is applied and increases as the pressure in the combustion chamber 22 (volume $A_v$) falls to atmospheric pressure near BDC crankshaft position.

While in motion, away from the resting (preloaded) position, the CA piston 14 has little internal stress. The stress that does exist is a function of both its own mass and the pressure differential acting upon it. The CA piston 14 has a low ratio of mass to surface area; it accelerates rapidly and consequently reduces the magnitude of the pressure differential acting upon it.

However, as the CA piston 14 approaches the rest position, rapid rebound damping occurs to decelerate and stop the CA piston 14 in a short distance. It is at this point that preload force and inertia force combine to impose the highest stress on the CA piston 14 of the entire reciprocating cycle. The CA piston 14 mass is dictated by the amount of material required to keep component stress and temperature within acceptable limits at this high stress condition. The optimized design of the present invention has only enough optimally-placed material to keep the stress level acceptable for a given component life expectancy. A higher mass than this only further increases stress due to inertia and degrades component response. In addition to the requirements of cooling and lubrication strategy, the CA piston 14 does not impact a solid travel limit. At both ends of its travel, the CA piston 14 is cushioned pneumatically. If permitted to contact solid stops, CA piston 14 would rapidly destroy itself due to the high preload force, inertial force due to rapid deceleration, and high cycle rate.

Figure 6A:
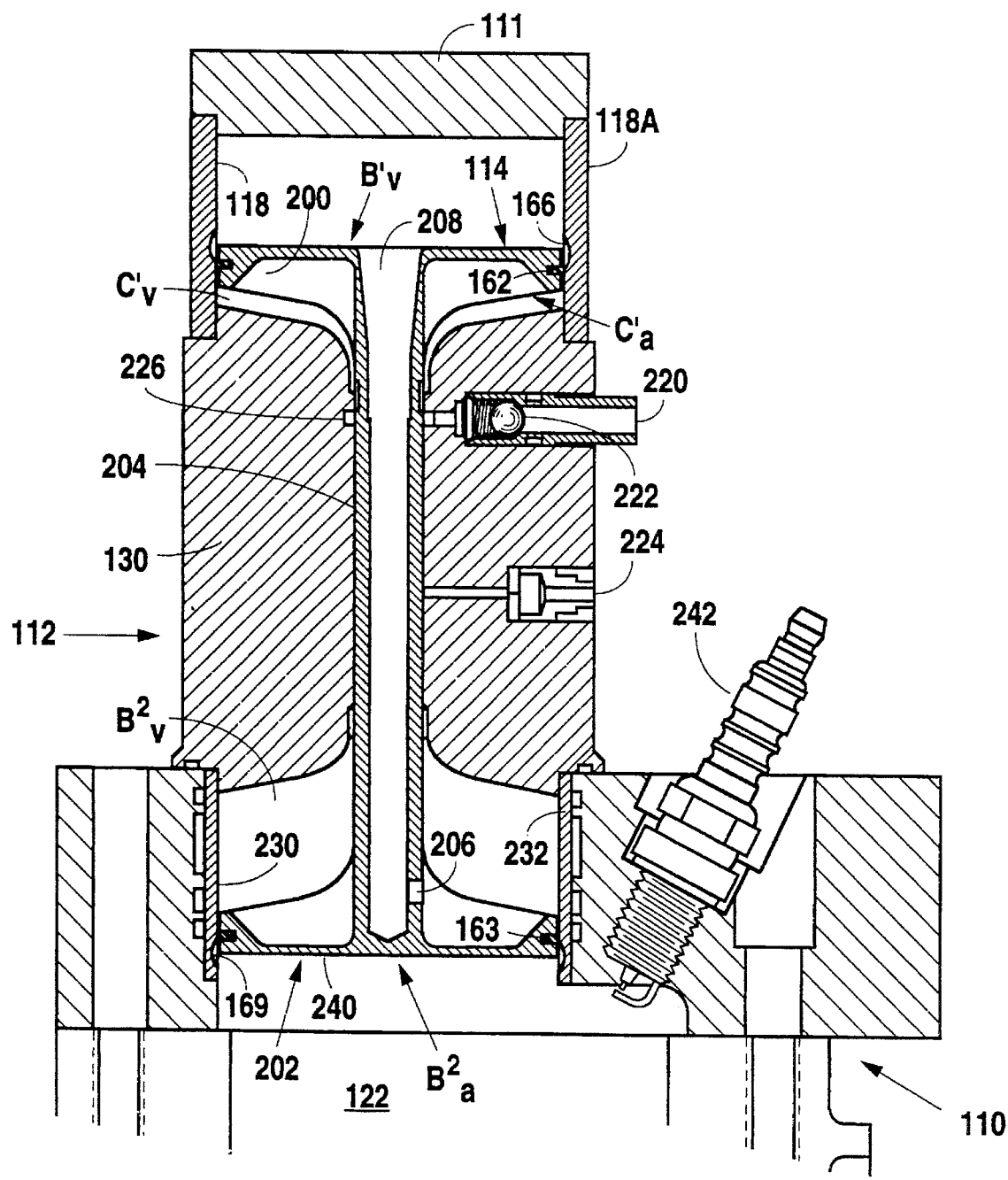
FIG. 6A illustrates a cross-sectional view of an alternate embodiment of the present invention.

FIG. 6A illustrates an alternative embodiment 110 of the present invention. The combustion accumulator piston 114 is shown within supplemental cylinder head 112 and guided in operation by guide 130. Head 112 is provided with a cylinder cap 111 and a mounting base 110. The cap 111, upper wall 118A, guide 130, lower wall 232, and base 110 essentially form the supplemental cylinder housing. Guide 130 is provided with an air pressure inlet 220 having a check valve 222 for regulating the preload pressures and dampening operations to be discussed further below. Guide 130 is also provided with a lubrication inlet 224.

Combustion accumulator piston 114 has a top head 200 and a bottom head 202 connected by an extended central stem 204. Stem 204 is hollow and allows for fluid communication between the volume of space $B^1_v$ above top head 200 and volume of space $B^2_v$ above bottom head 202 through openings 206 and 208 as seen in FIG. 6A. The combined volume of space $B^1_v$ and $B^2_v$ above heads 200 and 202 respectively corresponds in function to the total volume $B_v$ discussed above with the embodiment of FIG. 1. The volume of space $C_v^1$ beneath head 200 corresponds in function to the volume $C_v$ discussed above with the embodiment of FIG. 1.

The function of the combustion accumulator system diagrammed in FIG. 6A is principally similar to the embodiment of FIG. 1. The primary functional difference lies in the way that each system uses pressure to control combustion accumulator piston motion.

The embodiment 10 of FIG. 1 uses a passive air pressure spring and preload system. The system of embodiment 10 of FIG. 1 only requires the addition of air to match the rate of leakage past the CA piston rings 62 and 70. If the system did not leak air past the rings, the initial pressure supplied would sustain operation of the system without the need for additional air input.

The alternative embodiment 110 diagrammed in FIG. 6A utilizes an active air pressure spring and preload arrangement. As with embodiment 10, embodiment 110 uses force biases created by area bias ratio of $C_v/B_v$. In embodiment 110 $B_v$ is actually divided into two sub-volumes, $B_v^1$ and $B_v^2$, but act functionally as one, due to the fluid communication through passages 208 and 206. Thus, the system of embodiment 110 functions as its own proportional regulator.

Air pressure is admitted through air inlet 220 by a one-way check valve 222 to an annular groove 226 in the CA piston guide 130. The stem 204 of the CA piston 114 slightly moves or reciprocates within the guide 130 and controls air flow from the annular groove 226 into the volume chamber labeled $C_v^1$ by a reduced diameter segment 228 of the CA piston stem 204 as may be seen more fully in FIG. 6B. As air enters $C_v^1$ the pressure exerts a force on the area $C_a^1$ (on the underside of the top piston head 200.) This pressure causes the CA piston 114 to move upward to the threshold of uncovering divots 166.

The reduced diameter segment 228 allows admission of air pressure into volume $C_v^1$ only when the CA piston 114 is near the bottom of its stroke. This particular and unique cooperation of the annular groove 226 and the reduced diameter stem segment 228 is necessary to prevent air flow into $C_v^1$ during a transient condition when the CA piston 114 is active and serving its function to dampen a high-pressure occurrence in the main combustion chamber 122, as seen in FIG. 6C and discussed below. An admission of air during the combustion event would be detrimental to the rebound stroke of the CA piston 114 (hindering the returning of absorbed energy back to the combustion chamber 122).

Figure 6B:
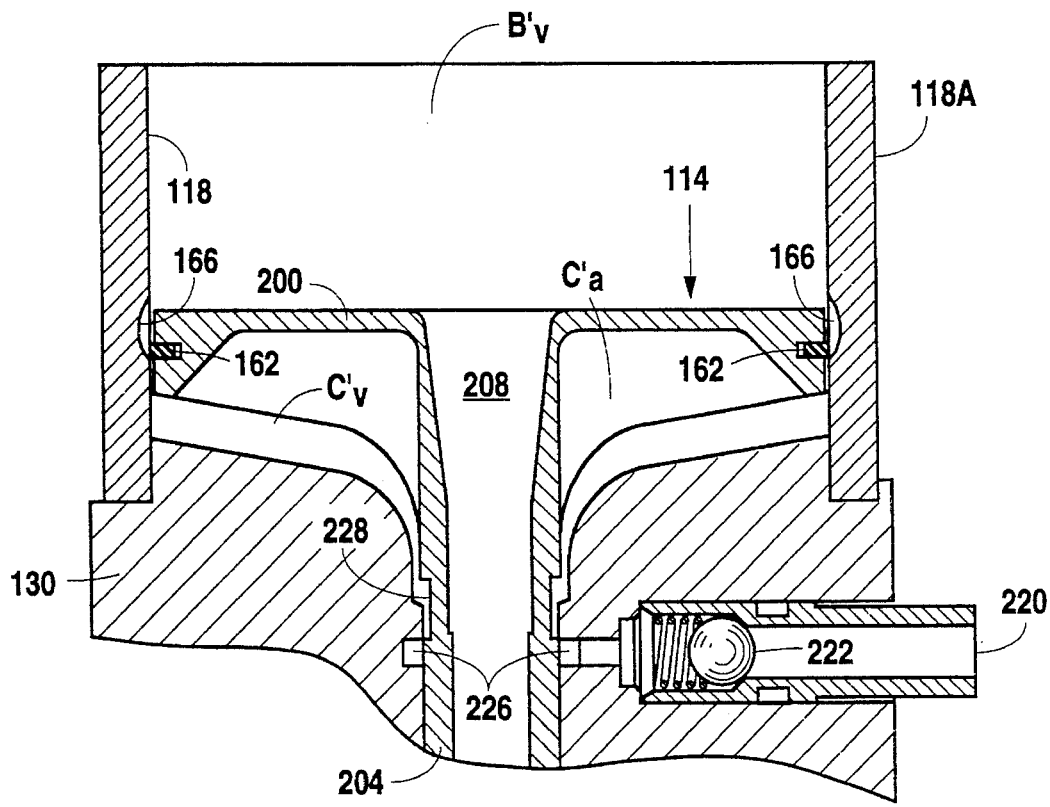
FIG. 6B illustrates in detail the relationship of the alternative embodiment combustion accumulator piston stem to the annular groove in the combustion accumulator piston cylinder wall bore in the resting position.
Figure 6C:
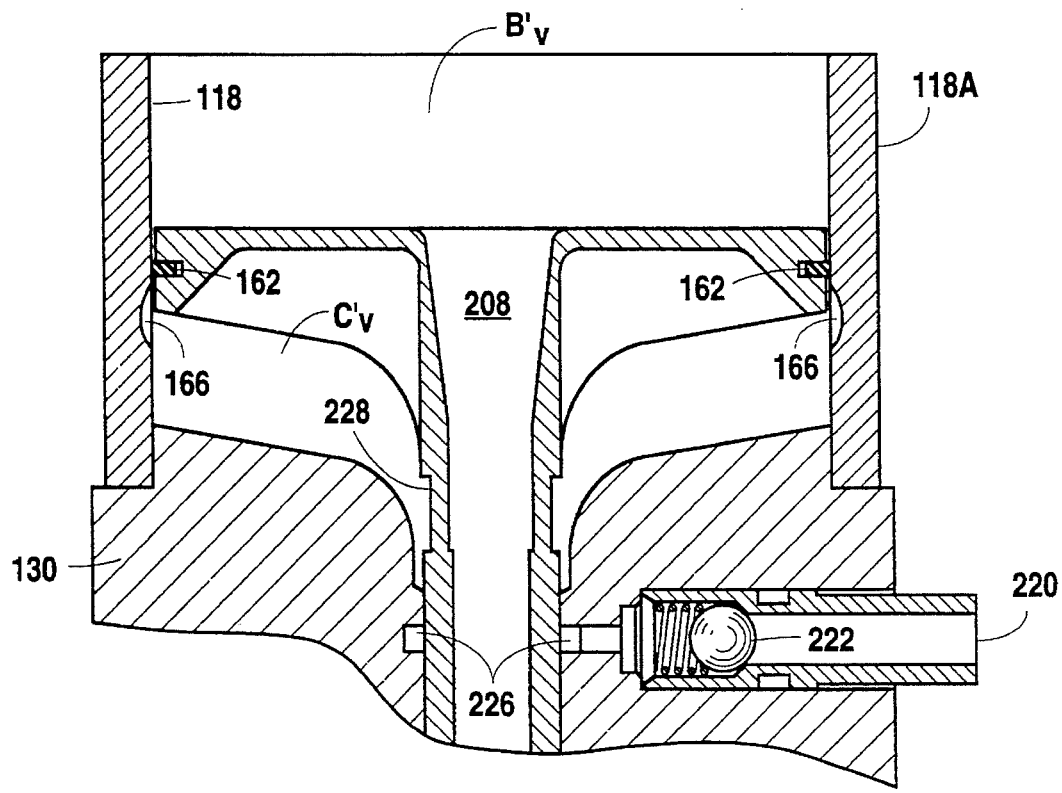
FIG. 6C illustrates the combustion accumulator piston of the alternative embodiment in a second or dampening position after the combustion event.

As may be seen further in FIG. 6B, there are many radially spaced divots 166 in the upper cylinder bore 118 on upper cylinder wall 118A. As the CA piston 114 moves slightly upward because of upward forces exerted in main cylinder 122, the upper piston ring 162 of piston 114 cooperates with the divots 166 allowing air to flow into $B_{v1}$ and $B_v^2$ (via hollow stem 208 to opening 206 into $B_v^2$). Because the areas on which the pressure acts are summed (and have a cumulative area that is 2.036 times the area of $C_a^1$) in the downward direction, opposite to the direction of force created by the pressure in $C_{v1}$, the upward motion of CA piston 114 is abruptly halted. This is what is meant by "its own proportional regulator."

The CA piston 114 remains in this equilibrium (or rest) position shown in FIG. 6B until the combustion event in cylinder 122, with the pressure in $C_{v1}$ being, for example, 2.036 times higher than the pressure in $B_v^1$ and $B_v^2$.

As the combustion cylinder pressure increases during the compression event, the CA piston 114 is forced upward to the point that the divots 166 in the upper cylinder wall bore 118 are uncovered. At this point the pressure ratio $C_v/B_v$ decreases as the force on the combustion surface 240 increases due to the increasing combustion cylinder pressure. Ultimately, after combustion has been initiated and commences in cylinder 122, the CA piston 114 encounters a transition from this resting position to the dynamic movement shown in FIGS. 6C and 6D that dampens, stores, then returns the absorbed energy to the combustion cylinder.

The equilibrium position will be maintained until the pressure in the main cylinder exceeds the inlet air pressure from the inlet line 220. Exceeding the inlet pressure occurs when the combustion event occurs in cylinder 122. This is shown in FIG. 6C where the combustion accumulator piston 114 is urged upwardly by the combustion in cylinder 122, and the reduced diameter segment 228 of stem 208 moves above the annular groove 226 closing off the air passage at inlet 220. Because the piston 114 is moved upwardly increasing the volume at $C_v^1$, the pressure in $C_v^1$ is reduced. It should be noted in FIG. 6C that the combustion accumulator piston ring 162 has moved above divots 166 preventing air in $C_v^1$ from flowing into $B_v^1$. This upward movement of piston 114 provides the dampening needed for the HCCI combustion phenomenon discussed above.

Figure 6D:
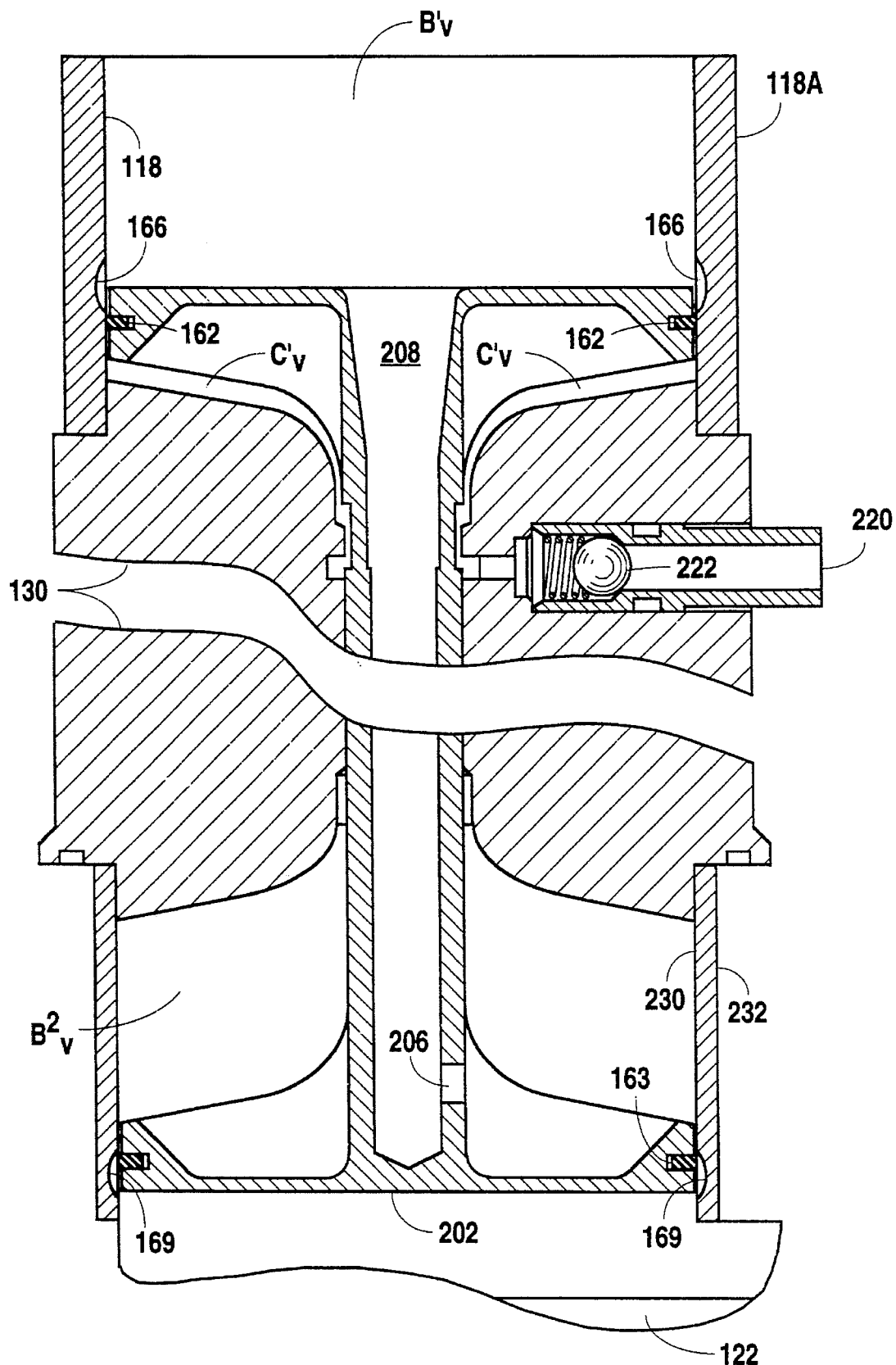
FIG. 6D illustrates the combustion accumulator piston of the alternative embodiment in a third or rebounding position as the main piston moves toward the bottom dead center position.

After the combustion event in cylinder 122, the main piston moves downwardly, as is well known, and the pressure in cylinder 122 begins to decrease. At this point in the engine's cycle, combustion accumulator piston 114 will begin to be urged downwardly because the top sides of piston heads 200 and 202 experience higher forces due to the area bias $B_v/C_v$ and $C_v^1$ is at a lower pressure. Thus combustion accumulator piston 114 is urged downward because of gas pressure and momentum. This is the rebounding action of combustion accumulator piston 114. Piston 114 will continue downwardly until bottom head 202 (with piston ring 163) passes over a second set of divots 169 in lower cylinder wall bore 230 of lower cylinder wall 232, as shown in FIG. 6D. As this occurs air in $B_v^2$ is bled (or flows) into cylinder 122, thereby lowering the pressure in $B_v^1$ and $B_v^2$ allowing the high pressure in $C_v^1$ to pull or force combustion accumulator piston 114 back toward the equilibrium position and preventing the combustion accumulator piston 114 from impacting the mechanical stop 113 of guide 130. The pressure in $C_v^1$ has increased because the volume at $C_v^1$ has decreased. FIG. 6D illustrates this third or rebounding position of the combustion accumulator piston 114.

Combustion accumulator piston 114 again returns to the equilibrium position shown in FIG. 6A.

The system seeks its own equilibrium position of FIG. 6A which is dictated by the location of the divots 166 and 169 and the pressures in $C_v^2$, $B_v^1$ and $B_v^2$, and the engine cylinder 122.

The arrangement of the second set of divots 169 serves a further function. Leakage past the upper piston ring 166 could cause the CA piston 114 to remain locked in the downward position if it were not for the second set of divots 169 located in the bottom inside bore 230 of the lower cylinder wall 232.

Air leakage from $C_v^1$ to $B_v^1$ causes the CA piston 114 to be forced downward, for example, (area ratio=2.036) until the lower CA piston ring 163 cooperates with the lower set of divots 169, allowing the pressurized air in $B_v^2$ to flow into the engine cylinder 122.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A supplemental cylinder head assembly mountable to an engine cylinder, said engine having a power piston movable within a combustion chamber and adapted to transfer power to a drive train during operation of said engine comprising:

an accumulator piston housing having an internal volume;

a combustion accumulator piston movable within said housing;

means on said combustion accumulator piston for dividing said internal volume of said housing into a first volume and a second volume;

means for providing fluid communication between said first and said second volumes during movement of said combustion accumulator piston within said housing;

means for guiding movement of said combustion accumulator piston within said housing during operation of said engine;

means for loading a predetermined force on said combustion accumulator piston to urge said combustion accumulator piston and said means for dividing said internal volume to a resting position during operation of said engine; and means for mounting said assembly to said engine cylinder whereby said engine is operable on any fuel having an octane value between zero and 130;

wherein said means for providing fluid communication between said first and said second volumes further comprises a first multiplicity of depressions in a first interior wall surface of said accumulator piston housing.

2. The supplemental cylinder head assembly of claim 1 wherein said engine is a compression ignition engine.

3. The supplemental cylinder head assembly of claim 1 wherein said engine is a spark ignition engine.

4. The supplemental cylinder head assembly of claim 1 wherein said means on said combustion accumulator piston for dividing said internal volume is a first combustion accumulator piston ring.

5. The supplemental cylinder head assembly of claim 1 wherein said depressions be in a first same horizontal plane.

6. The supplemental cylinder head assembly of claim 5 wherein said means on said combustion accumulator piston for dividing said internal volume is a first combustion accumulator piston ring which cooperates with said depressions to allow for equalization of fluid pressures in said first and said second volumes when said combustion accumulator piston passes over said depressions during movement of said combustion accumulator piston within said housing.

7. The supplemental cylinder head assembly of claim 1 wherein said means for guiding said combustion accumulator piston further comprises means for cooling said combustion accumulator piston during said operation of said engine.

8. The supplemental cylinder head assembly of claim 7 wherein said combustion accumulator piston has an internal chamber containing a quantity of liquid coolant.

9. The supplemental cylinder head assembly of claim 3 wherein said means for guiding said combustion accumulator piston is adapted to generally centrally mount a spark ignition source within said combustion chamber of said engine.

10. The supplemental cylinder head assembly of claim 1 wherein said combustion accumulator piston has an upper surface above said first piston ring having a first surface area, an under surface below said first piston ring having a second surface area, and a combustion surface having a third surface area exposed to and in fluid communication with said combustion chamber.

11. The supplemental cylinder head assembly of claim 1 wherein said combustion accumulator piston further comprises a combustion surface exposed to and in fluid communication with said combustion chamber, said combustion surface substantially spaced apart from a lower end of said combustion accumulator piston by an insulating air gap.

12. The supplemental cylinder head assembly of claim 5 further comprising a means for preventing said combustion accumulator piston from impacting a mechanical stop in said engine.

13. The supplemental cylinder head assembly of claim 12 wherein said means for preventing said combustion accumulator piston from impacting said mechanical stop further comprises a second multiplicity of depressions in a second internal wall surface of said accumulator piston housing, said second depressions lying in a second same horizontal plane, said second depressions cooperating with a second combustion accumulator piston ring on a lower head of said combustion accumulator piston to release air pressure from a space above said lower head into said combustion chamber.

* * * * *

UNITED STATES PATENT AND TRADEMARK OFFICE
CERTIFICATE OF CORRECTION

PATENT NO. : 5,476,072
DATED : December 19, 1995
INVENTOR(S) : Evan Guy

It is certified that error appears in the above-indentified patent and that said Letters Patent is hereby corrected as shown below:

On the title page item [76], should read --Evan Guy--.

Signed and Sealed this

Nineteenth Day of March, 1996

*Attest:*

BRUCE LEHMAN

*Attesting Officer*  *Commissioner of Patents and Trademarks*